Figure 1:
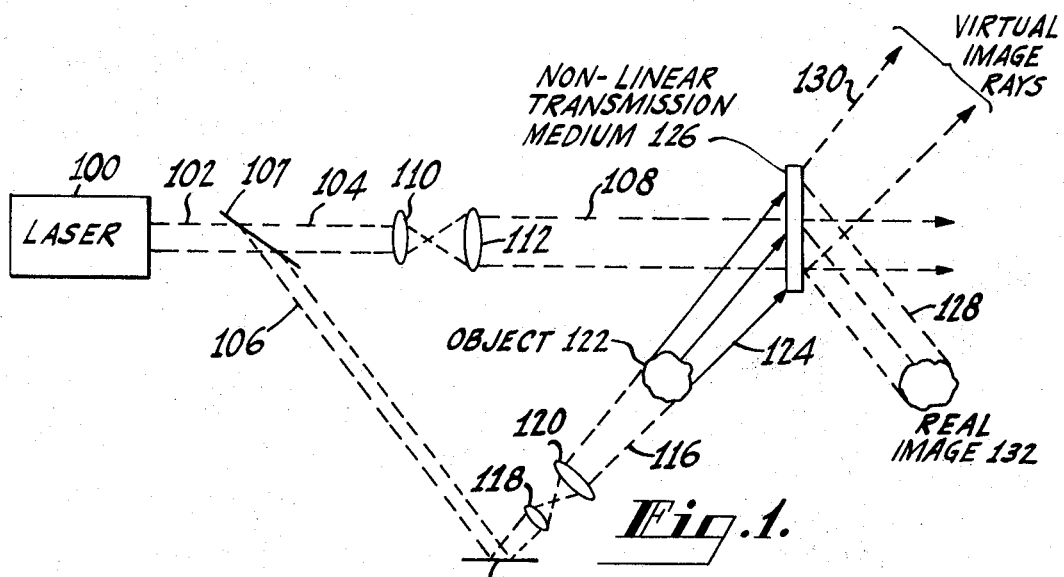

United States Patent

[11] 3,542,452

[72] Inventors Hendrik J. Gerritsen
Princeton Junction;
Henry S. Sommers, Jr., Princeton, New Jersey
[21] Appl. No. 624,334
[22] Filed March 20, 1967
[45] Patented Nov. 24, 1970
[73] Assignee RCA Corporation
a corporation of Delaware

[54] TRANSITORY HOLOGRAM APPARATUS
9 Claims, 3 Drawing Figs.
[52] U.S. Cl. ............................................... 350/3.5, 350/160
[51] Int. Cl. ........................................................ G02b 27/00
[50] Field of Search ............................................ 350/3.5, 160, 160P; 178/(Inquired)

[56] References Cited
UNITED STATES PATENTS
| | | | |
|---|---|---|---|
| 3,444,316 | 5/1969 | Gerritsen ....................... | 350/3.5 |
| 3,296,594 | 1/1967 | Van Heerden ................. | 350/3.5 |
| 3,323,244 | 6/1967 | Schreiber .................. | 350/160(P)UX |

OTHER REFERENCES

Megla, Applied Optics, Vol. 5, No. 6, June 1966, pp. 945—960.

*Primary Examiner*—David Schonberg
*Assistant Examiner*—Ronald J. Stern
*Attorney*—Edward J. Norton ABSTRACT: A medium having a short persistence nonlinear transmission characteristic is utilized in the present invention for simultaneously making and reconstructing transitory holograms in real time.

The present invention permits light amplification as well as up or down frequency conversion to take place between the making and reconstruction of the transitory holograms.

INVENTORS
HENDRIK J. GERRITSEN &
HENRY S. SOMMERS, JR

BY Edward J. Norton
ATTORNEY

TRANSITORY HOLOGRAM APPARATUS

This invention relates to hologram apparatus and, more particularly, to apparatus for simultaneously making and reconstructing a transitory hologram of an object in real time.

Holograms are described in detail in the article "Photographs by Laser", by Emmett Leith and Juris Upatnicks, appearing on page 24 of the June 1965 issue of Scientific American.

In the past, a hologram consisted of a recording, on a recording medium such as a photographic film, of the interference fringes in a wafer resulting from the interference between a first or reference component of wave energy, such as light, obtained directly from a spatially coherent monochromatic wave source and a second or information wave energy component from an object simultaneously illuminated by wave energy from the same source. In order to obtain these interference fringes, the reference component arrives at the separate points of the recording medium at certain predetermined angles, while the information component arrives at each of the separate points at an angle which in general is different from the certain predetermined angle at which the reference component arrives at that point.

In the past, after the hologram has been recorded on the recording medium, such as a photographic film, it is necessary to develop the film before the recorded hologram can be reconstructed. Reconstruction of a developed recorded hologram is obtained by illuminating a hologram with a source of spatially coherent monochromatic wave energy, such as light. In this case the hologram diffracts light impinging thereon to form two sets of first-order diffracted waves each of which is a replica of the waves that issued from the original object. One of these two sets, when projected back towards the illuminating source produces a virtual image of the original object, while the other of these two sets produces a real image of the object without the use of a lens.

The wave energy utilized for reconstructing a hologram may have the same wavelength used in making the hologram, in which case the size of the virtual and real images are identical to the size of the actual object. On the other hand, the wave energy utilized in reconstructing the hologram may have a different wavelength from the wave energy used in making the hologram, in which case the reconstructed image will be magnified if the wavelength utilized in reconstructing the hologram is longer than the wavelength of the wave energy utilized in making the hologram or will be diminished in size if the energy utilized in reconstructing the hologram is shorter than the wavelength utilized in making the hologram.

From the above discussion it is clear that in the past holograms were recorded at one time and reconstructed at a later time. It is the purpose of the present invention to produce transitory holograms which may be simultaneously recorded and reconstructed in real time.

There are many advantages in being able to produce transitory holograms which may be simultaneously made and reconstructed in real time. First, since the hologram may be viewed at the same time it is being made, the object may be moved or otherwise manipulated in any desired manner in accordance with information obtained by an observer from the observed image. Second, by utilizing lower wavelength wave energy for reconstructing the transient hologram than that of the wavelength of the wave energy utilized in making the hologram, magnification may be obtained. Third, by utilizing either a relatively high intensity reference and/or a relatively high intensity reconstruction beam of wave energy, while utilizing a relatively low intensity beam of wave energy for illuminating the object itself, light amplification may be obtained so that the image appears brighter than the actual object illuminated with the relatively low intensity wave energy. This is particularly desirable where the object to be reproduced is delicate, such as a celluloid film, sheet of paper or face of a person. In these cases, a large amount of object illuminating energy, such as pulsed light from a laser, could cause damage. Furthermore this light amplification is obtainable with the three-dimensional properties of the object intact Fourth, by utilizing different wavelengths of wave energy to make and reconstruct a transitory hologram, either up conversion or down conversion can be obtained. Therefore, scenes illuminated with infrared can be viewed in visible light or even scenes viewed in microwaves, such as radar echoes, could possibly be viewed in visible light. Fifth, because the transitory hologram is continually being reformed during the illumination, the requirement on the time interval during which the information and reference beams must maintain relative coherence is relaxed, permitting quality reconstruction of transitory holograms made with light of lower coherence.

It is therefore an object of the present invention to provide apparatus for simultaneously making and reconstructing transitory holograms in real time.

In particular, the present invention features the use of a nonlinear transmission medium having a real time transmission or reflection characteristic at a given wavelength which is a nonlinear function of the intensity of electromagnetic energy of this given wavelength incident thereon for producing an observable interference pattern between a hologram reference beam and a hologram information medium in real time.

Figure 2:
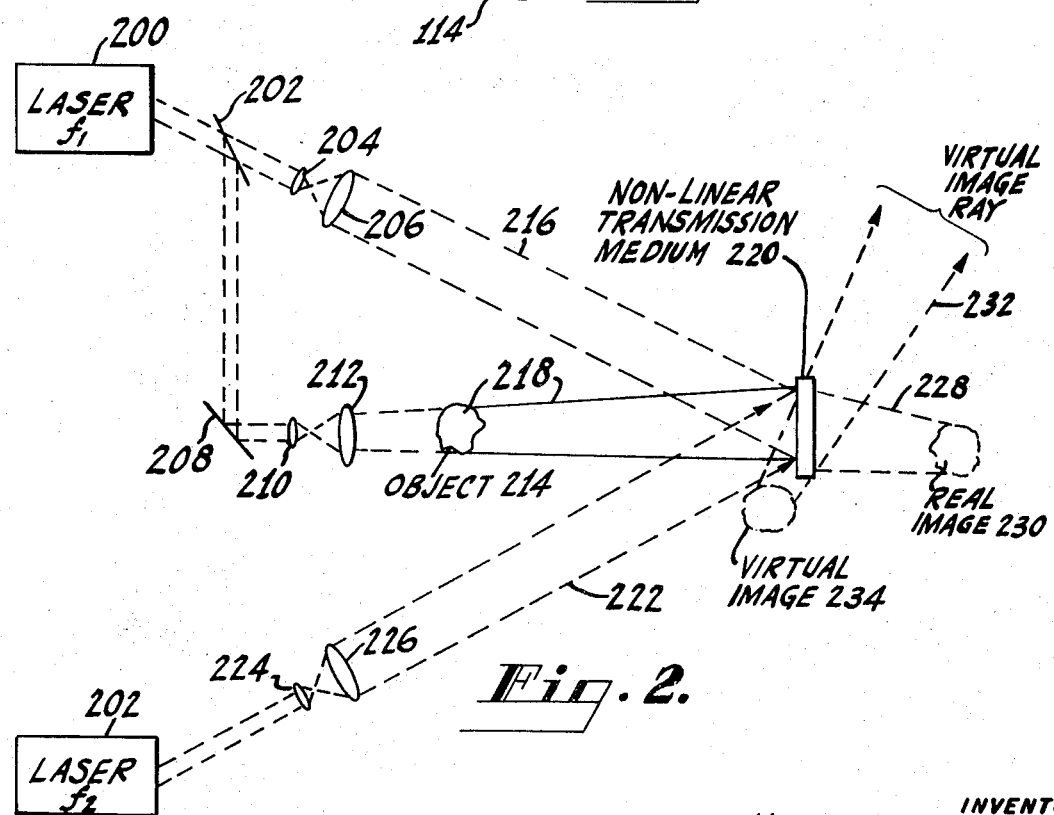
Figure 3:
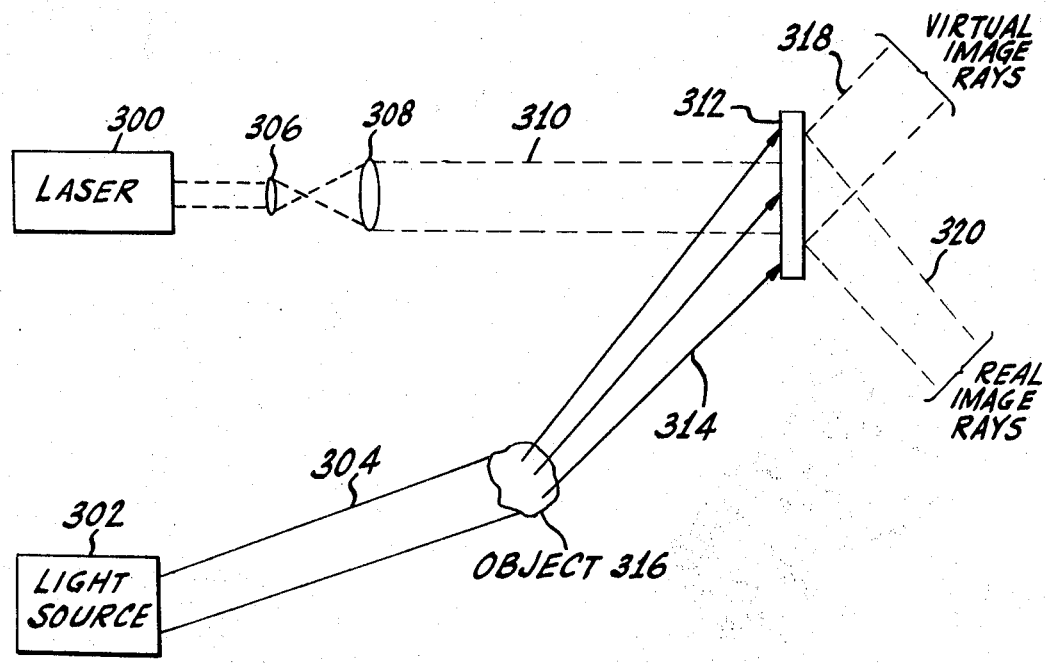

These and other objects, features and advantages of the present invention will become more apparent from the following detailed description taken together with the accompanying drawing in which:

FIG. 1 is a block diagram of a first preferred embodiment of the present invention in which wave energy of the same wavelength is used for both making and reconstructing a transitory hologram of an object;

FIG. 2 is a block diagram of a second preferred embodiment of the present invention in which wave energy of different wavelengths are utilized for making and reconstructing a transitory hologram of an object; and FIG. 3 is a block diagram of a third preferred embodiment of the present invention in which wave energy of one wavelength is used as the reference beam and wave energy of one or more other wavelengths is used as the information beam in making and reconstructing a transitory hologram.

Referring to FIG. 1, there is shown a spatially coherent source of light of a predetermined frequency, such as laser 100. Beam of light 102 emitted by laser 100 is divided into first component beam 104 and second component beam 106 by partially reflecting mirror 107. First component beam 104 is widened into reference beam 108 by lenses 110 and 112, as shown. Second component beam 106, after reflection from totally reflecting mirror 114, is widened into beam 116 by lenses 118 and 120, as shown.

Object 122 in the path of beam 116, is illuminated thereby to produce information light beam 124, which may consist of light scattered, reflected and/or transmitted by object 122.

In the path of reference beam 108 is a nonlinear transmission medium 126. At least a portion of information beam 124 also impinges upon nonlinear transmission medium 126. As shown in FIG. 1, reference beam 108 and information beam 124 arrive at the respective points of nonlinear transmission medium 126 at different angles with respect to each other.

Up to this point, the apparatus shown in FIG. 1, is identical to the apparatus normally utilized for recording a hologram, except for the fact that in the present invention nonlinear transmission medium 126 replaces the usually used recording medium.

Nonlinear transmission medium 126 is composed of a material having a transmission characteristic at the wavelength of the spatially coherent light emitted by laser 100 which depends on the intensity of light then being transmitted therethrough. By the term "transmission characteristic" is meant the real-time relationship between the total intensity of light impinging on each separate point of the surface of transmission medium 126 and that portion of this light which is actually transmitted through medium 126. In particular, the "transmission characteristic" of medium 126 depends on the manner in which the absorption, the index of refraction, and the reflection of medium 126 vary as a function of the intensity of wave energy which impinges on each separate point of medium 126.

The term "real-time" with respect to the transmission characteristic implies that the material of which medium 126 is composed is characterized by a fast response to optical radiation in that the changes in its transmission characteristic due to the presence of optical radiation are of short persistence compared to recording materials normally used in making holograms, such as photographic emulsions, photochromics, or thermoplastics. It is these short persistence nonlinear effects which permit the realization of transitory holograms.

One example of a nonlinear transmission medium with short persistence is a mica sheet filled with cryptocyanine which has been inserted between the mica flakes of the mica sheet. Other examples of transmission mediums having nonlinear transmission characteristics and short persistence are saturable absorbers such as selenium films, materials with strong electro-optical effects such as nitrobenzene, crystals like KDP, ADP, LiNbO$_3$, and materials with large shifts in bandgap in strong light fields such as GaAs and SbSI. Another example of a nonlinear transmission medium within the context of this disclosure is a material whose index of refraction or absorption changes in a nondestructive, quickly self-recoverable way from localized heating resulting from the incident radiation.

The intensity of the light impinging on each point of nonlinear transmission medium 126 depends upon the respective amplitudes and the relative phase of the waves arriving at that point from reference beam 108 and from information beam 124, respectively. Thus, the intensity of the light will vary from point to point to produce an interference pattern which is modulated in accordance with the information about object 122 in information beam 124. Since transmission medium 126 is nonlinear, this interference pattern will become manifest within medium 126, causing diffraction of the light transmitted therethrough and resulting in the occurrence of two sets of diffracted waves 128 and 130, respectively.

As shown, set 128 of diffracted waves converges to form real image 132 which appears in real time at a position conjugate to the position of actual object 122. Also as shown, set 130 of diffracted waves diverges to form rays of a virtual image which is coincident in position with actual object 122. Also as shown, set 130 of diffracted waves diverges to form rays of a virtual image which is coincident in position with actual object 122 and which occurs in real time simultaneously with the production of the hologram in nonlinear transmission medium 126 by reference beam 108 and an information beam 124, respectively. Thus, nonlinear transmission medium 126 is effective in producing a transitory hologram.

Referring now to FIG. 2, there is shown a first laser 200, which operates at a first frequency $f_1$, and second laser 202, which operates at a second frequency $f_2$. The respective frequencies $f_1$ and $f_2$ of lasers 200 and 202, respectively, are different from each other.

Laser 200, together with partially reflecting mirror 202, lenses 204 and 206, totally reflecting mirror 208, lenses 210 and 212, object 214, are effective in producing reference beam 216 and information beam 218 which impinge upon the surface of nonlinear transmission medium 220, which is similar to nonlinear transmission medium 126, to produce an interference pattern in the same manner as described above in connection with the embodiment shown in FIG. 1.

In the case of FIG. 2, nonlinear transmission medium 220 has an effective nonlinear transmission characteristic frequency $f_1$. However, at frequency $f_2$, nonlinear transmission medium 220 has at least an approximately linear transmission characteristic. Therefore, the intensity of readout beam 222, formed from the output of laser 202 by lenses 224 and 226, does not seriously affect the interference pattern produced by reference beam 226 and information beam 218 at frequency $f_1$.

However, readout beam 222 "sees" the interference pattern produced in real time in nonlinear transmission medium 220 by reference beam 216 and an information beam 218. Therefore, two sets of first order diffracted waves at frequency $f_2$ of laser 202 will be produced. One of the sets of diffracted waves 228 will converge, as shown, to form real image 230, while the other set of diffracted waves 232 will diverge as shown to form virtual image 234.

It will be seen that in the case of FIG. 2, if $f_2$ is greater than $f_1$, up-conversion will occur, while if $f_2$ is smaller than $f_1$, down-conversion will occur. Further, as well known in the hologram art, if $f_2$ is smaller than $f_1$, the size of both real image 230 and virtual image 234 will be magnified with respect to the size of object 214. By making the relative intensity of readout beam 222 large relative to the intensity of beam 218 with which object 214 is illuminated, both real image 230 and virtual image 234 may be made to appear brighter than object 214 itself appears when viewed directly. In other words, the transitory hologram apparatus shown in FIG. 2 can be effective in amplifying light.

Referring now to FIG. 3, there is shown laser 300 producing a light output at frequency $f$ and light source 302 producing light beam 304. Light beam 304, produced by light source 302, may be monochromatic at another frequency within a frequency interval occupied by frequency $f$ or it may include a plurality of other frequencies within this frequency interval. Further, the wave energy of light beam 304 may be synchronous with or otherwise related to the wave energy from laser 300 or the wave energy of light beam may be asynchronous with and unrelated to the wave energy from laser 300.

Light beam 310, which is utilized both as the reference beam and the readout beam in FIG. 3, is formed from the output of laser 300 by lenses 306 and 308. As shown, light beam 310 is directed to and incident on nonlinear transmission medium 312. Information beam 314, which is obtained from object 316 in response to the illumination of object 316 by light beam 304, also is incident on nonlinear transmission medium 312, as shown. Nonlinear transmission medium 312 is similar to nonlinear transmission medium 126, described above, and has a nonlinear transmission characteristic over the frequency interval occupied by frequency $f$ and by the wave energy of light beam 304.

Although in FIG. 3 beams 310 and 314 may be essentially noncoherent, the fact that beam 310 is simultaneously utilized as a reference beam and as a readout beam causes the transitory hologram interference pattern formed by information beam 314 and beam 310 at any instant in time to be accurately reconstructed, even though the interference pattern is constantly varying in time and being reformed. Thus, diverging diffracted waves 318 and converging diffracted waves 320 will produce respectively in real time a virtual image and a real image of object 316.

Although only three preferred embodiments of the present invention have been described in detail herein, it is not intended that the invention be restricted thereto, but that it be limited by the true spirit and scope of the appended claims.

We claim:

1. Transitory hologram apparatus for producing a hologram in real time, said apparatus comprising an electromagnetic energy transmission characteristic within a given wavelength interval which is a nonlinear function of the intensity of electromagnetic energy within said given wavelength interval being transmitted therethrough, said transmission characteristic having a persistence sufficiently short so that the portion of the said energy illuminating any point of said medium which is transmitted through said medium depends exclusively on the intensity of said energy then illuminating that point, and means for simultaneously illuminating said medium with first and second beams of electromagnetic energy within said given wavelength interval, said first beam arriving at separate points of said medium at certain predetermined angles with an intensity which is constant from instant to instant over a time interval, said second beam arriving at each of said separate points at an angle which is different from the certain predetermined angle at which said first beam arrives at that point with an intensity which may be variable from instant to instant over said time interval to thereby produce a transitory interference pattern between said first and second beams in said medium in real time which varies from instant to instant over said time interval in accordance with any variation in said second beam.

2. Apparatus as defined in claim 1, further comprising a third beam of electromagnetic energy arriving at the interference pattern in said medium simultaneously with the arrival of said first and second beams of light.

3. Apparatus defined in claim 2, wherein the wavelength of said electromagnetic energy of said first and second beams is the same given wavelength and the wavelength of said third beam is different from said given wavelength and is outside of said given wavelength interval.

4. Apparatus defined in claim 3, wherein the wavelength of said electromagnetic energy of said third beam is longer than said given wavelength.

5. Apparatus defined in claim 3, wherein the intensity of said third beam is large relative to the intensity of said second beam.

6. Apparatus as defined in claim 1, wherein the intensity of said first beam is large relative to the intensity of said second beam.

7. Apparatus defined in claim 1, wherein said illuminating means includes a spatially coherent source of electromagnetic energy having said given wavelength, means for illuminating an object with energy from said source to derive therefrom said second beam as a hologram information beam, and means for directly illuminating said medium with energy from said source to provide said first beam as a hologram reference beam, whereby said interference pattern manifests a hologram.

8. Apparatus defined in claim 1, wherein said illuminating means comprises a monochromatic electromagnetic energy source for producing said first beam at a predetermined wavelength interval, and means incorporating a second electromagnetic energy source emitting wave energy which is within said given wavelength interval for deriving said second beam as a hologram information beam from an object illuminated with energy from said second source.

9. Apparatus as defined in claim 8, wherein said second source emits a plurality of different wavelengths within said given wavelength interval